(12) United States Patent
Zhang

(10) Patent No.: US 8,161,181 B2
(45) Date of Patent: Apr. 17, 2012

(54) CONTENT DELIVERING METHOD AND SYSTEM FOR COMPUTER NETWORK

(76) Inventor: Yongmin Zhang, Guangdong (CN)

( * ) Notice: Subject to any disclaimer, the term of this patent is extended or adjusted under 35 U.S.C. 154(b) by 206 days.

(21) Appl. No.: 12/525,532

(22) PCT Filed: Nov. 21, 2007

(86) PCT No.: PCT/CN2007/071100
§ 371 (c)(1), (2), (4) Date: Jul. 31, 2009

(87) PCT Pub. No.: WO2008/095396
PCT Pub. Date: Aug. 14, 2008

(65) Prior Publication Data
US 2010/0082836 A1 Apr. 1, 2010

(30) Foreign Application Priority Data
Feb. 8, 2007 (CN) .......................... 2007 1 0073295

(51) Int. Cl.
*G06F 15/16* (2006.01)
(52) U.S. Cl. ........................ 709/232; 709/217
(58) Field of Classification Search .................. 709/232, 709/217
See application file for complete search history.

(56) References Cited

U.S. PATENT DOCUMENTS

| | | | | |
|---|---|---|---|---|
| 5,884,031 A * | 3/1999 | Ice | | 709/203 |
| 6,003,087 A * | 12/1999 | Housel et al. | | 709/229 |
| 6,895,431 B1 * | 5/2005 | Bero | | 709/220 |
| 7,584,285 B2 * | 9/2009 | Hudson et al. | | 709/228 |
| 7,944,832 B2 * | 5/2011 | Zhang | | 370/233 |
| 2005/0120133 A1 * | 6/2005 | Slack-Smith | | 709/234 |
| 2006/0010103 A1 * | 1/2006 | Malik | | 707/3 |
| 2006/0133264 A1 * | 6/2006 | Yamauchi | | 370/216 |
| 2007/0242607 A1 * | 10/2007 | Sadler et al. | | 370/238 |
| 2009/0172157 A1 * | 7/2009 | Zhang | | 709/224 |
| 2011/0126294 A1 * | 5/2011 | Aaron | | 726/26 |

* cited by examiner

*Primary Examiner* — Faruk Hamza
*Assistant Examiner* — Oleg Survillo
(74) *Attorney, Agent, or Firm* — Global IP Services; Tianhua Gu

(57) ABSTRACT

A content delivering method for computer network and system are provided. The present invention classifies nodes participating in content transmission into a transmitting group and a receiving group, and uses the groups to manage the nodes dynamically entering or quitting, and the management includes grouping, monitoring and reflecting update of CDS of group controlling information. Real time management for nodes is achieved through CDS, and the nodes in the transmitting group communicate information according to nodes recorded in the CDS. Multiple nodes in the transmitting group cooperate with each other in transmitting content. Firstly, transmission tasks are assigned to nodes in the transmitting group, and then, nodes in the transmitting group divide assigned content into many blocks and package them and transmit to nodes in the receiving group, and nodes in the receiving group which have received content packages exchange the content packages in the group according to the control data set. Therefore, the content is simultaneously transmitted from a plurality of nodes to other a plurality of nodes, and content transmission speed is high.

10 Claims, 5 Drawing Sheets

| Content ID | Packet No | CDS No | Exchange Type | Block Length | Content Block |
|---|---|---|---|---|---|
Fig. 2
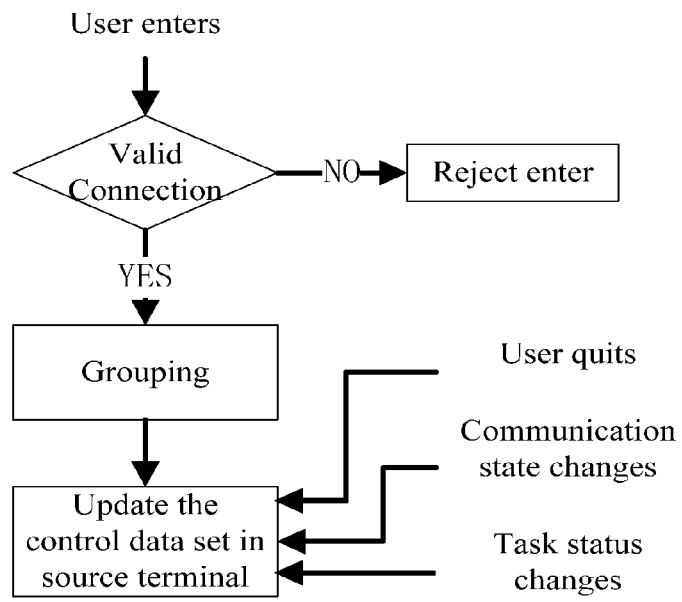
Fig. 3
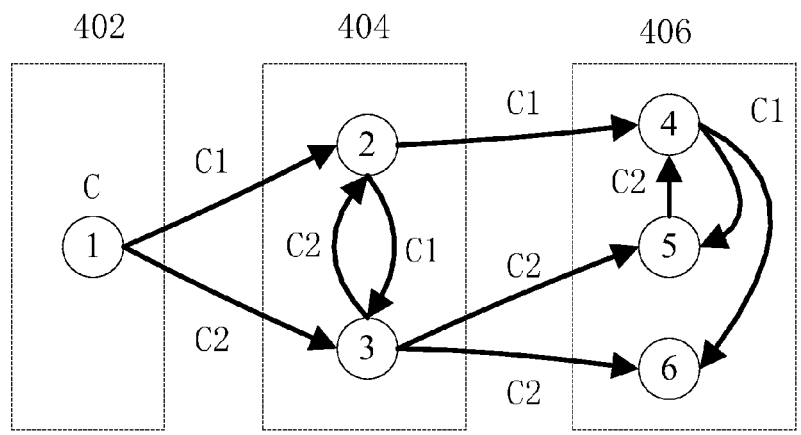
Fig. 4

| | | | | | | |
|---|---|---|---|---|---|---|
| I | A | B | C | D | E | F |

| | | | | | | |
|---|---|---|---|---|---|---|
| II | A | B | M | N | E | F |

| | | | | | | | |
|---|---|---|---|---|---|---|---|
| III | i | Length | A | B | M | N | E | F |

| | | | | |
|---|---|---|---|---|
| IV | Skewing | Length | M | N |

Fig. 5

CONTENT DELIVERING METHOD AND SYSTEM FOR COMPUTER NETWORK

The present application is the US national stage of PCT/CN2007/071100 filed on Nov. 21, 2007, which claims the priority of the Chinese patent application No. 200710073295.5 filed on Feb. 8, 2007, which application is incorporated herein by reference.

FIELD OF THE INVENTION

The present invention relates to a method and system of content delivering for a computer network.

BACKGROUND OF THE INVENTION

A processing unit with the computing function in a computer network (such as computers, communication equipment and so on) is referred to as a node.

The basis of Internet communication technology is the packet switching network technology, which is usually called "Packet Switching". one basic idea of the Packet Switching is that when the information is transmitted, firstly it would be divided into several packets (usually known as data packets), and transmitted out separately after being organized with serial numbers, and then putted together at the destination according to the serial numbers.

The original packet switching means that information in the source end is divided into several data packets and transmitted to destination end. The transmission path is completed by the network equipment, and is private to the users. This kind of communication can be referred to as "one-to-one" communication.

Nowadays content in many communication applications needs to be distributed to a plurality of computers in many cases, which is usually known as an application layer multicast of overlay network. In transmission process, Packet Switching technology and working principles of Store and Forward are also adopted, but when transmission is completed, it is necessary to ensure that a plurality of nodes have copies of the transmitted content. This kind of communication can be regarded as "one-to-many" communication.

Although the traditional C/S pattern communication seems to be "one-to-many", that is, one server for a plurality of clients. However, this perspective is usually thought to be macroscopical. In transmission details, transmission between the server and a client is independent, so C/S pattern is thought to be "one-to-one" communication in the present application.

Some people think that since information has widely existed in the network world, why not make full use of existing data. Then there comes to a method of requesting data from multi-sources, such as multi-source BitTorrent. This kind of communication can be regarded as "many-to-one" communication.

The significance of "many-to-one" is also specific to transmission link, that is, content that needs to be transmitted is stored in a plurality of nodes. Moreover, during transmission, Packet Switching technology is also adopted. The difference lies in that each node of the plurality of nodes that responsible for transmission only transmits a portion of the content. As there can be a plurality of nodes transmitting simultaneously, "many-to-one" can improve transmission speed.

Actually, there is also a "many-to-many" communication, the significance of which is also specific to transmission link, that is, content that needs to be transmitted is stored in a plurality of nodes, which cooperatively transmit the content simultaneously to other plurality of nodes. "Many-to-many" communication is positive, and it can improve efficiency and simplify problems. The reason why it can simplify problems is that other communication forms such as "one-to-one", "one-to-many" and "many-to-one" can all be reduced to "many-to-many".

"Many-to-many" communication is needed in many cases. For example, "many-to-one" communication does well in resolving the problem of file sharing, but still needs some improvements. "many-to-one" will bring to two problems: (i) nodes need to request link, and also possibly need query to a plurality of nodes; (ii) nodes that responsible for transmission are possible uneven, so that some nodes may carry no transmission, while some other nodes are so busy as to cause congestion. The reason of the problems mentioned above is that, the plurality of nodes in the source end do not cooperate with the plurality of nodes in the receiving end very well. If there is a global transmission scheduling, query in (i) can be avoided and load balance in (ii) can be solved. But with a global transmission scheduling, it can be called "many-to-many" communication rather than "many-to-one" communication any more.

"Many-to-many" communication is complex, in which three following key problems must be solved.

A. How to manage nodes? To make nodes with different capabilities and behaviors adapted to the dynamic network, in which, nodes may enter or quit at any moment.

B. How to transmit. Or in other words, how to transmit content from a plurality of nodes to other plurality of nodes simultaneously?

C. How to guarantee QoS of transmission. For example, how to implement a transmission scheduling, congestion control and error control in a dynamic network environment?

When being transmitted, the content is divided into many content blocks for transmission, and at this moment, where they are transmitted to needs to be notified. Methods of notifying can be different according to the different environments, and one of the common methods is to be notified with a transmitting table or a routing table.

When the nodes receive some content blocks, they may need to transmit such content blocks again, and members need to be notified of the target users of transmission again. Methods of notifying can be different according to the different environments. One of the adopted methods is that when content blocks are packaged and transmitted, a table of users who need transmission again is attached, in which necessary date for communication is contained, and this method adapts to transmitting again to a few users. Another method adopted is that members in the receiving group maintain the related transmitting table or routing table, which can be one or more—content blocks transmitted from different places use different transmitting tables or routing tables, be publicly or privately. In this method, the transmitting tables or routing tables need to be maintained dynamically.

The notifying methods mentioned above can be used for content delivering. However, as existing methods can not solve technique problems mentioned above very well, a more advanced improving method still needs to be adopted.

SUMMARY OF THE INVENTION

The objective of this invention is to overcome said problem in transmission and node control in the prior art and to provide a content delivering method and system for computer network, which can realize the simultaneously transmission of content from a plurality of nodes to other plurality of nodes through the real time management for nodes, and in turn the transmission speed is improved.

Another objective e of this invention is to provide a content delivering method and system for computer network, in which resources of each node can be made use of more reasonably and sufficiently, through controlling the uploading rate of each node, and in turn the network congestion will be reduced.

For the objectives above, the technical solution adopted in this invention is a content delivering method for computer network, which comprising the following steps.

A1. Nodes participating in content transmission are classified into a transmitting group in charge of transmitting content and a receiving group in charge of receiving content. Nodes that have existed or will participate and in charge of content transmission are classified into the transmitting group management and Nodes that have existed or will participate and need to receive content are classified into the receiving group management;

B1. A control data set reflecting information of the group it belongs to is established for each transmitting group or receiving group, and each control data set is set with a serial number which is updated after change of the control data set in every time or during a period of time, so as to establish one-to-one correspondence between the control data set and the serial number. Said control data set at least comprises basic information of each node in the group, which at least comprises the communication address of this node;

C1. The control data set is delivered to each node of the group, and each node is made to keep the latest control data set of the group;

D1. Content that needs to be transmitted is divided into a plurality of portions, and the portions need to be transmitted are assigned to nodes in the transmitting group which taking charge;

E1. The content that needs to be transmitted is divided into a plurality of content blocks, and then assembled to be a content packet by the Nodes in the transmitting group, wherein, the content packet comprises serial number marks of the control data set;

F1. The control data set of the receiving group that receiving this content packet is delivered to nodes of the transmitting group, and before transmitting, the serial number marks of the control data set is set to be the current serial numbers of the control data set of the receiving group that receiving this content packet;

G1. According to the control data set of the receiving group, nodes in the transmitting group respectively transmit the data packet to at least one node of the receiving group;

H1. After receiving the content packet transmitted from the transmitting group, the node in the receiving group transmits said content blocks again to other nodes in need of the content blocks within the group according to the control data set indicated by the serial number marks of the content packet.

I11. Nodes in the receiving group recover the content blocks transmitted by each node to the transmitted content.

After receiving some or all portions of the content, said receiving group becomes a new transmitting group, which continues transmitting the received content to another receiving group.

Wherein, said changes of the control data set in step B1 include the entering, quitting of the nodes, the changes of the task and the change of the node status, and said node preserves many control data sets with different serial numbers.

Wherein, a preferred scheme of making each node keep the latest control data set of the group in said step B1 comprises the following steps.

B11. The server extracts the control data set of the group which needs maintenance at the set time intervals or before transmitting the content packet;

B12. Through comparing the whole set of the latest control data set of the group with the whole set of the previously existing control data set according to symbols, the server gets a change string;

B13. A change set is got after transmutation and compression of the change string, and said change set carries serial number marks of both the latest control data set and the existing control data set as a comparison base;

B14. The change set is transmitted to at least one of the nodes in the group so that the existing control data set can be updated to the latest one by the node.

Wherein, the length of said symbol in step B12 is preferred to be one or two bytes.

Wherein, a change set got after transmutation and compression of the change string in said step B13 comprises [starting marks] [serial number of the new control data set] [serial number of the old control data set] [skewing 1] [change string head 1] [change string 1] [skewing 2] [change string head 2] [change string 2] . . . [skewing i] [change string head i] [change string i][checking sum] and [ending marks], wherein the skewing at least comprises skewing length of the variable length codes, and the change string head at least comprises change string length of the variable length codes, and the change string is the changed portions of the new control data set compared with the old control data set, and i is the number of the change string in the change set, and is an integral number greater than or equal to zero.

A further improvement of this invention is that each node in the group processes the content based on the control data set of the group, including validity checking of the received content packet, content retransmitting and content supplementarily transmitting.

Said content can be audio/video data, data stream, computer files, UDP data packets on network, control data sets or change sets of control data sets.

A much further improvement of this invention is that nodes in the receiving group are classified into a plurality of supporting groups in a preset way, and when nodes waiting for the content packet have not received the content packet during the agreed receiving time period, supplementing packet request is sent out to other nodes in the supporting groups with priority to request the node to transmit supplementarily the content packet it lacks.

In the process of content delivering, there are also following steps.

A2. Based on the bandwidth $W_j$ that can be used by the node j in the receiving group for content uploading, the system selects a reasonable uploading rate $U_j$;

B2. Node j in the receiving group is controlled to participate in content uploading service at the uploading rate $U_j$ appointed by the system, wherein j=1, 2 . . . N, and N is the number of nodes in the receiving group, and said uploading rate coefficient $U_j$ satisfies the following relational expression:

$$(U_1 + \ldots + U_N) + L*D \geq f(N,D)$$

Wherein D is rate of content delivering, and f(N,D) is a function related to N*D, which is the bandwidth needed by all nodes in the receiving group for content downloading; L*D is the sum of uploading rate provided by all nodes in the transmitting group.

Wherein, in said step A2, the system can select a reasonable uploading rate $U_j$ by the following steps:

When bandwidth $W_j$ that can be used by the node j for content uploading is narrower than or equal to average uploading rate $U_{avg}$ provided by the node for content, then select Uj=Wj;

When bandwidth $W_j$ that can be used by the node j for content uploading is wider than average uploading rate $U_{avg}$ provided by the node for content, then $U_j$ selected should satisfy $U_j \geq U_{avg}$.

When parameters Wj, L and N change, then the condition $(U_1+ \ldots +U_N)+L*D \geq f(N, D)$ can not be satisfied, parameters $W_j$, L and D can be modified appropriately. Or when parameters $W_j$, L and N change and parameter L or B needs to be and also can be changed, parameters $W_j$, L and D can be modified appropriately.

For the purposes above, this invention also provides a content delivering method for computer network comprising the following steps:

A3. Nodes participating in content transmission are classified into a transmitting group in charge of transmitting content and a receiving group in charge of receiving content, Nodes that have existed or will participate and in charge of content transmission are classified into a transmitting group management, and Nodes that have existed or will participate and need to receive content are classified into a receiving group management;

B3. A control data set reflecting information of the group it belongs to is established for each transmitting group or receiving group, and each control data set is set with a serial number, which is updated after change of the control data set in every time or during a period of time, so as to establish one-to-one correspondence between the control data set and the serial number. Said control data set at least comprises basic information of each node in the group, which at least comprises the communication address of this node;

C3. The control data set is delivered to each node, and each node is made to keep the latest control data set of the group;

D3. Content that needs to be transmitted is divided into a plurality of portions, and the portions need to be transmitted are assigned to nodes in the transmitting group which taking charge;

E3. The content that needs to be transmitted is divided into a plurality of content blocks, which then assembled to be a content packet by the Nodes in the transmitting group, wherein, the content packet comprises serial number marks of the control data set;

F3. The control data set of the receiving group that receiving this content packet is delivered to nodes of the transmitting group, and before transmitting, the serial number marks of the control data set is set to be the current serial numbers of the control data set of the receiving group that receiving this content packet;

G3. Based on the control data set of the receiving group, nodes in the transmitting group respectively transmit the data packet to at least one node of the receiving group;

H3. After receiving the content packet transmitted from the transmitting group, the node in the receiving group decides whether the content packet needs to be exchanged within the group according to exchange type marks of the content packet, when exchange is needed, the node transmits said content blocks again to other nodes in need of the content blocks in the group according to the control data set indicated by the serial number marks of the content packet;

I3. Nodes in the receiving group recover the content blocks transmitted by each node to the transmitted content.

In step H3, the node receiving the content packet also decides whether the content packet needs to be delivered to other receiving groups according to exchange type marks of the content packet.

For the objective above, this invention also provides a content delivering system for computer network, comprising a grouping device, which is used to classify nodes participating in content transmission into a transmitting group in charge of transmitting content and a receiving group in charge of receiving content, and to classify nodes that have existed or will participate and in charge of content transmission into the transmitting group management, and to classify nodes that have existed or will participate and need to receive content into the receiving group management; a control data set generation device, which is used to establish a control data set reflecting information of the group it belongs to for each transmitting group or receiving group, also to set a serial number for each control data set, and to update the serial number after the change of the control data set in every time or during a period of time so as to make one-to-one correspondence between the control data set and the serial number, said control data set at least comprises basic information of each node in the group, which at least comprises communication address of this node; a transmitting device, which is used to deliver the control data set to each node of the group, and make each node keep the latest control data set of the group; a first processing device, which is used to divide content that needs to be transmitted into a plurality of portions and assigns the content portions need to be transmitted to nodes in the transmitting group; a second processing device, which is used to control nodes in the transmitting group to divide the content that needs to be transmitted into a plurality of content blocks, and assemble the content blocks to a content packet which comprises serial number marks of the control data set, and said transmitting device is also used to deliver the control data set of the receiving group that receiving this content packet to nodes in the transmitting group; a third processing device, which is used to control nodes in the transmitting group to set the serial number marks of the control data set to be the current serial numbers of the control data set of the receiving group that receiving this content packet before transmitting; a fourth processing device, which is used to control nodes in the transmitting group respectively transmit the data packet to at least one node of the receiving group according to the control data set of the receiving group; a fifth processing device, which is used to control the node in the receiving group to transmit said content blocks again to other nodes in need of the content blocks in the group after receiving the content packet transmitted from the transmitting group according to the control data set indicated by the serial number marks of the content packet; a content recovering device, which is used to control nodes in the receiving group to recover the content blocks transmitted by each node to the transmitted content.

Said changes of the control data set include the entering, quitting of the nodes, the changes of the task and the changes of the node status, and said node preserves many control data sets with different serial numbers.

Wherein, said control data set generation device comprises a control data set extraction unit, which is used to make the server extract the control data set of the group needing maintenance at the set time intervals or before transmitting the content packet; a comparison unit, which is used to get a change string through comparing the whole set of the latest control data set of the group with the whole set of the previously existing control data set according to symbols; a transmutation unit, which is used to get a change unit of a change set through transmuting and compressing the change string, wherein said change set carries serial number marks of both the latest control data set and the existing control data set as a comparing base; and a transmission unit, which is used to transmit the change set to at least one of the nodes in the group so that the existing control data set can be updated to the latest one by the node.

The length of said symbol is preferred to be one or two bytes.

A change set got after transmutation and compression of the change string comprises [starting marks] [serial number of the new control data set][serial number of the old control data set][skewing 1] [change string head 1][change string 1][skewing 2] [change string head 2] [change string 2] . . . [skewing i] [change string head i] [change string i] [checking sum] and [ending marks], wherein the skewing at least comprises skewing length of the variable length codes, and the change string head at least comprises change string length of the variable length codes, and the change string is the changed parts of the new control data set compared with the old control data set, and i is the number of the change string in the change set, and is an integral number greater than or equal to zero.

A sixth processing unit is also included, which is used to make each node in the group process the content based on the control data set of the group, including validity checking of the received content packet, content retransmitting and content supplementarily transmitting. Said content can be audio/video data, data stream, computer files, UDP data packets on network, control data sets or change sets of control data sets.

Further improvements of this invention also include a congestion control device, which comprising a rate selection unit, which is used to select a reasonable uploading rate $U_j$ according to the bandwidth $W_j$ that can be used by the node j in the receiving group for content uploading, a seventh processing unit, which is used to control node j in the receiving group to participate in content uploading service at the uploading rate $U_j$ appointed by the system, wherein j=1, 2 . . . N, and N is the number of nodes in the receiving group, and said uploading rate coefficient $U_j$ satisfies the following relational expression:

$$(U_1+\ldots+U_N)+L*D \geqq f(N,D)$$

Wherein D is rate of content delivering, and f(N,D) is a function related to N*D, which is the bandwidth needed by all nodes in the receiving group for content downloading; L*D is the sum of uploading rate provided by all nodes in the transmitting group.

For the objective above, this invention also provides a content delivering system for computer network, wherein, comprising a grouping device, which is used to classify nodes participating in content transmission into a transmitting group in charge of transmitting content and a receiving group in charge of receiving content, and to classify nodes that have existed or will participate and in charge of content transmission into the transmitting group management, and to classify nodes that have existed or will participate and need to receive content into the receiving group management; a control data set generation device, which is used to establish a control data set reflecting information of the group it belongs to for each transmitting group or receiving group, also to set a serial number for each control data set, and to update the serial number after the change of the control data set in every time or during a period of time so as to make one-to-one correspondence between the control data set and the serial number, said control data set at least comprises basic information of each node in the group, which at least comprises communication address of this node; a transmitting device, which is used to deliver the control data set to each node of the group, and make each node keep the latest control data set of the group; a first processing device, which is used to divide content that needs to be transmitted into a plurality of portions, and assign the content portions need to be transmitted to nodes in the transmitting group; a second processing device, which is used to control nodes in the transmitting group to divide the content that needs to be transmitted into a plurality of content blocks, and assemble the content blocks to a content packet which comprises serial number marks of the control data set, and said transmitting device is also used to deliver the control data set of the receiving group that receiving this content packet to nodes in the transmitting group; a third processing device, which is used to control nodes in the transmitting group to set the serial number marks of the control data set to be the current serial numbers of the control data set of the receiving group that receiving this content packet before transmitting; a fourth processing device, which is used to control nodes in the transmitting group respectively transmit the data packet to at least one node of the receiving group according to the control data set of the receiving group; a fifth processing device, which is used to control the node in the receiving group to decide whether the content packet needs to be exchanged within the group according to exchange type marks of the content packet after receiving the content packet transmitted from the transmitting group, when exchange is needed, the node transmits said content blocks again to other nodes in need of the content blocks in the group according to the control data set indicated by the serial number marks of the content packet; and a content recovering device, which is used to control nodes in the receiving group to recover the content blocks transmitted by each node to the transmitted content.

This invention provides a specific and effective "many-to-many" transmission method with advantage that: the nodes dynamically entering and quitting can be well managed by the group (by managing control data sets), while group-to-group topology structure can meet "many-to-many" transmission requirements in different cases. Compared with the prior art, an obvious difference is that there is a cooperative task distribution among transmitting members. The specific effects include: 1) in this invention, nodes participating in content transmission are classified into a transmitting group and a receiving group, and for each group, a control data set is established, through which real-time management of the nodes is achieved, make nodes in the transmitting group divide content into many blocks and package them and then transmit them to nodes in the receiving group according to the communication information of the nodes recorded in the control data set, and nodes in the receiving group that received the content packages exchange the content packages within the group according to the control data set, in turn, the content is simultaneously transmitted from a plurality of nodes to other plurality of nodes, and content transmission speed is improved compared to the prior art. 2) While the control data set is being updated, only changed portions of the control data set are transmitted, and a compressing process with less time-consuming and simple process that adapting to real-time environments can be applied to said changed portions, so that updating the control data set with low cost is achieved. 3) Through selecting reasonable uploading rate for each node, it is easy to build a transmission scheduling which can make full use of the capacity of each node, and network congestion is effectively reduced.

The characteristics and advantages of this invention will be illustrated in detail through embodiments with attached figures.

BRIEF DESCRIPTION OF THE DRAWINGS

FIG. 2 is a block diagram of a content packet according to an embodiment of present invention;

FIG. 3 is a schematic diagram of a CDS according to present invention;

FIG. 4 is a schematic diagram of a kind of G2G content transmission according to present invention;

FIG. 5 is a schematic diagram of transmutation and compression of a CDS change string according to present invention;

DETAILED DESCRIPTION OF THE PREFERRED EMBODIMENT

Figure 1:
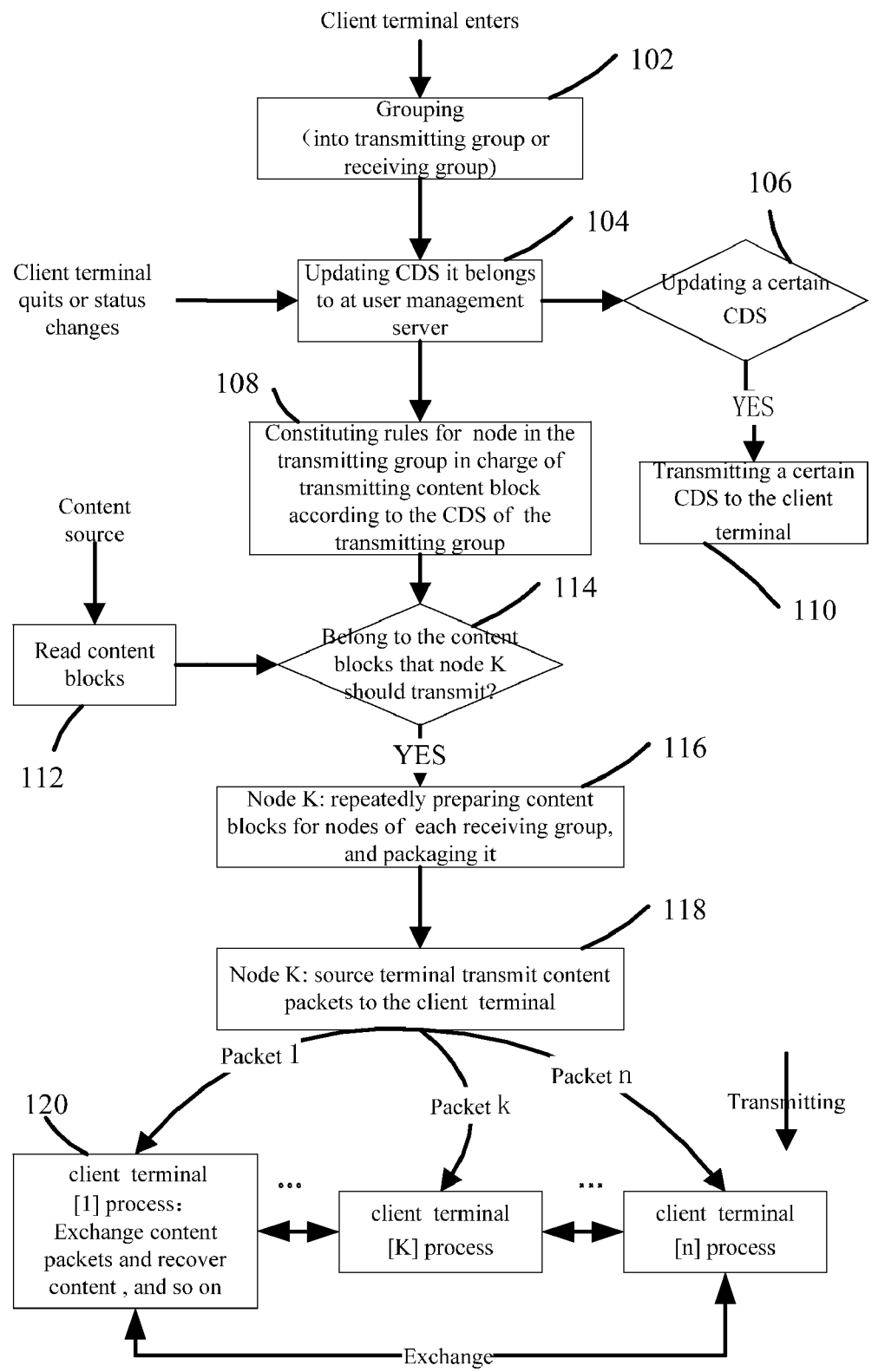
FIG. 1 is a flowchart according to an embodiment of present invention.

The core content of this invention is that nodes participating in transmitting are classified into groups, content that needs to be transmitted are divided into blocks, and then monitored and updated by the control data set (CDS for short), that is, every group has a CDS, each member maintains related CDS on real time, and many operations are based on CDS.

This invention can be applied to computer network environments. In this invention, nodes are processing units with computing function in the network, such as personal computers (PCs), palmtop equipments, multiprocessor systems, programmable consumer electronics based on microprocessor, network PCs, microcomputers, desktop computers, portable computers, consumer application equipments with microprocessor or microcontroller, routers, gateways, HUB or similar equipments.

The network consists of a plurality of nodes, but not all communications are "many-to-many" communication. To be distinguished from the prior art, "many-to-many" is defined as follows:

Definition 1: "many-to-many" transmission means that content is transmitted from a plurality of nodes to other plurality of nodes within a certain period of time, also has multi-node cooperative transmission.

"Many-to-many" transmission is provided with time effective and cooperative, and the transmitted content is dispersed.

G2G transmission is a kind of "many-to-many" transmission. A group is a collection of nodes with the same attributes. Attributes of the group can be contents, tasks, network rate, location, distance, delay, node identification, stability (online time, packet loss rate), and location of starting to receive contents. Included but not limited, any other attributes related to tasks, behaviors, individual difference, and identification can also be attributes of the group. Attributes can be multi-selected. Attributes preset to be no longer subdivided are referred to as basic attributes, whereas attributes with more than two basic attributes are referred to as composite attributes. There can be many groups with same attributed for the same task.

There are one or more node members in a (non-empty) group. Nodes participating in transmitting content are classified into at least two groups. The group in charge of transmitting content is referred to as the transmitting group, and the group in charge of receiving contents transmitted by other groups is referred to as the receiving group. Content transmission like this can be regarded as a group-to-group transmission, that is, content is transmitted from the transmitting group to the receiving group, which is G2G for short.

The network comprised by the groups and related to the relation between the groups is referred to as a G2G network. Two main characteristics of the G2G network are as follows.

Characteristic 1: As the group is characterized by organization and multi-nodes, many-to-many network communication can be replaced by G2G network communication. It is known that many-to-many network communication can greatly increase efficiency, but it is very difficult to be implemented. Replacing "many-to-many" with "group-to-group" is the beginning of attempting to solve the problem. The primary "many" is arbitrary or disorganized, whereas groups can be established based on attributes, which means organized "many". It is an effective method of changing arbitrary "many" to regular "group".

The group is also is characterized by dynamics, that is, nodes are allowed to enter and quit dynamically. The characteristic of organization makes the group manageable, which is the basis of the node management discussed below, and also makes communication in the G2G network easily managed, or controlled.

Characteristic 2: connection between the transmitting group and the receiving group in basic G2G transmission is many-to-many connection, which is the basis of cooperative transmission in the G2G network. A fully-connected topology structure between nodes of the transmitting group and nodes of the receiving group can be built, through which programming of transmission router is arranged. Some edges are not actually connected, which can be regarded that a certain weight of these edges is zero. Furthermore, each connection edge is assigned with some needed weights (such as uploading bandwidth) to optimize routing.

Definition 2, G2G transmission means that content of source end (group) is transmitted to the target group.

Supposing that the content has been delivered to a plurality of nodes of the transmitting group, the process of transmitting from the transmitting group to the receiving group at one time includes:

Definition 3, basic G2G transmission means that content in one or more nodes of the transmitting group is cooperatively transmitted to the some or all nodes of the receiving group. But it is also called G2G transmission for short in many cases.

Figure 8:
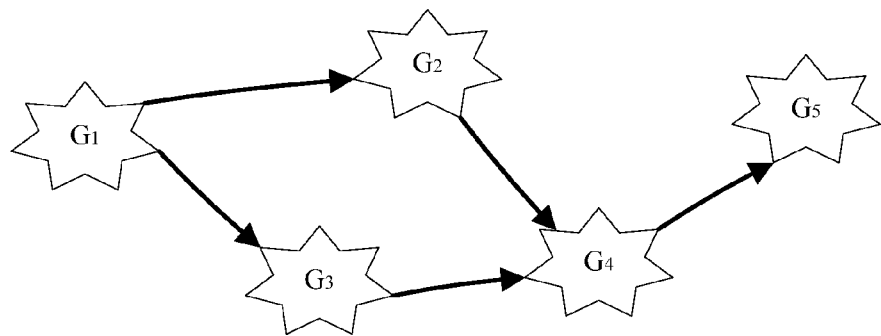
FIG. 8 is a diagram of a G2G topology structure according to present invention.

FIG. 8 is a diagram of a G2G transmission topology structure, which shows that G2G transmission from source end (group) to the target group may pass through many groups between them. G2G transmission consists of one or more basic G2G transmissions. A plurality of groups can bee used to accomplish large-scale content distribution.

In FIG. 8, group G1 is in charge of transmission to both G2 and G3, which are two basic G2G transmissions. G2 and G3 can have the same attributes, that is, both are receiving group of G1, or have different attributes. For example, G2 is in charge of management of the receiving group of nodes in area A, while G3 is in charge of management of the receiving group of nodes in area B.

There are two kinds of transmission for G2G transmission, that is, inter-group transmission and inner-group transmission. To distinguish these two transmissions, the concepts below are for reference.

Transmission means a transmitting group transmits content to a receiving group.

Exchange means within a group, members transmit content with each other.

For G2G, common applicable methods include:

G2G transmission principle is that content that needs to be transmitted is divided into many blocks, and a plurality of nodes participating in content transmission are classified into many groups, and some or all members in the transmission group possessing this content participate in said content block distribution, and said members respectively transmit the distributed content blocks to some or all members of the receiving group in need of the content, and if necessary, members in the receiving group exchange again the content blocks transmitted from said nodes to other members in the group.

Information of a node is needed to transmit content packet to it. The group may have some information related to nodes. If there are many groups, identification information related to the groups is provided for distinguish. This information is referred to as group information.

To be distinguished from transmitted information (content), the information data table, especially control data of controlling communication and tasks, is referred to as the control data set, which is CDS for short. The groups with information are more operable. CDS comprises task description and routing policies, so that according to information of a content packet and CDS, delivering routing of the content packet can be known.

As a matter of fact, many operations of groups are based on the control data set. For example, grouping or changes of status can be reflected in the control data set to update CDS. FIG. 3 shows an example of a CDS application. Necessary communication data brought by user's entering, grouping information and task information and so on are added into the CDS. Quitting of other users, changes of communication status and task status should also be reflected in the CDS in time to update the CDS.

Marks are frequently used, such as to indicate which group the control data set belongs to, and what content is transmitted, etc. CDS discussed now is a special mark in this invention, that is, a change mark, which is used to identify data sets of different periods and status according to its changing order. Generally a serial number (SN) is set for a CDS, and different SN is set to distinguish change of CDS in every time or during a period.

When changed portions of CDS are transmitted, generally an old CDS is needed for reference. When a CDS changes, CN of the CDS is used to distinguish the new CDS from the old one.

In order that only changed portions are transmitted when updated, the new CDS needs to be compared with the old ones to form a change set, which is then transmitted to nodes, and the new CDS can be recovered by the nodes according to the change set and some old CDS stored in the nodes. In these processes, SN marks identified in order are needed.

When G2G mode is adopted to transmit the change set, there may be a plurality of change sets since they are produced continuously. To distinguish them, the change sets also need to be marked by SN. Generally, a change set is produced with a combination of SN of a new and an old CDS.

Finally, when G2G transmission is based on CDS, and by employing SN marks, each transmitting packet can be set to base on a CDS with a specific SN mark. The advantages brought in by this manner are:

(1) a node can simultaneously have many CDS with different SN, and when content packets are exchanged, there can be different transmitting routings for each content packet;

(2) when receiving a transmitting packet without CDS appointed by SN, a node can request updating in time, which is good for CDS maintenance.

(3) validity and time-effectiveness of the content packet can be identified by SN marks of CDS of the content packet, so that the data security is maintained.

To sum up, marks identified in order of CDS (SN) are very important.

In this invention, basic G2G transmission and CDS depend on each other, and can also distribute content together so well that both can be regarded as integrative. For emphasizing, this kind of relationship can be denoted as G2G/CDS protocol.

The structure of the content packet in G2G content transmission is defined to at least comprise serial numbers of CDS. The specific structure of an embodiment is showed in FIG. 2:

Content ID refers to content identification, which is used to distinguish content delivering.

Packet No. refers to content packet number. Generally continuous numbers are used to indicate location of the content packet in content.

CDS SN refers to SN of CDS used in content transmission.

Exchange Type (ET) refers to exchange type. When its value is zero, the received content packet need not be exchanged. When the value is one, the content packet need be exchanged, and ET of the exchanged content packet is set to be zero. When the value is two, nodes deliver the content packet by means of delivering tree in the receiving group.

Block Length (BL) refers to the length of the content block needing to be transmitted.

Content Block refers to the content block needing to be transmitted.

G2G/CDS protocol refers to that a CDS is established for content needing to be distributed to manage nodes participating in delivering, and to maintain and update CDS of each node in time. A corresponding serial number (SN) is set for each CDS, and different SNs are used to distinguish changes of CDS during a period or in every time. For CDS of a certain group, a node can preserve many CDS with different SN.

The transmitting group divides content needing to be distributed into many content blocks, packages and numbers them, and also adds CDS SN to be used while transmitting to the content packet, and then transmits them to the receiving group; when receiving a content packet, the node in the receiving group firstly judges whether the content packet is right, one judging methods is to judge the validity of the value of "CDS SN" of the content packet: If is valid, the content packet will be exchanged in the group according to the CDS indicated by its CDS SN, that is, the content packet is transmitted to the nodes needing the content packet in the group. Or judge whether the content packet needs to be exchanged according to the ET value, and when the exchange is needed, the CDS indicated by the CDS SN is used to transmit.

Now, let's see how basic G2G transmission and CDS work together closely, and take user entering and quitting during content transmission as an example.

CDS (f) is a CDS whose SN is f. There are totally n members and content packet k is represented by P (k). The transmitting group is transmitting P (k), in which SN of CDS indicated by "CDS SN" is f. After receiving P (k), a node in the receiving group judges whether it needs to be exchanged according to the ET value, and when exchanging, the node modifies the ET value of P (k), and also retransmits P (k) to other (n−1) nodes according to the information of CDS (f). When no members and no status change, the node continues receiving new content packets transmitted from the transmitting group, and then retransmits P (k+1) with the same CDS (f).

When a new member is added, CDS (f) becomes CDS (f+1) and there are totally (n+1) members. The transmitting group is transmitting P (k+1), in which indicating the mark of CDS is f+1. After receiving P (k+1) transmitted by the transmitting group, a node in the receiving group retransmits P (k+1) to other n nodes according to the information of CDS (f+1).

During the transmitting process with a new node added, it does not matter even if the node receives P (k) and P (k+1) in a random order, because there are both CDS (f) and CDS (f+1) in the node, which can complete retransmitting P (k) and P (k+1) correctly.

With the same reasons, when a member quits, CDS (f) becomes CDS (f+1) and there are totally (n−1) members. The transmitting group is transmitting P (k+1), in which SN of CDS indicated is f+1. After receiving P (k+1) transmitted by the transmitting group, a node in the receiving group retransmits P (k+1) to other (n−2) nodes according to the information of CDS (f+1).

In any transmitted P (k) there is an indication for CDS with which serial number is used, such as f or CDS (f). If there is no CDS (f) in the node, the reason may be one of these two reasons: (i) if f is a reasonable serial number of this content transmission, which shows that the node lacks CDS (f), and at this moment, the node can update CDS (f) in time or request other nodes to supplementarily transmit CDS (f); (ii) if f is a illegal serial number, which shows that P (k) may be an overdue content packet or baleful content packet rather than the content packet of this transmitted content, and at this time, P (k) can be rejected. Therefore, CDS can be of great benefit for powerfulness and security of G2G transmission.

In a transmitting lifecycle of time t, if there are n members (or n times of members) that once participated in transmitting, there will be information about nodes entering and quitting in CDS. Supposing that the length of information about node entering is p and the length of information about node quitting is q, total information S formed through changing of members in the transmitting lifecycle will be $$S=n(p+q) \quad (1)$$

As previously mentioned, the entering and quitting of nodes are reflected in CDS and the maintenance of CDS must be real time. Once CDS changes, CDS of each member should be updated in time. Obviously, when updating, transmitting the whole CDS every time is not desirable, and data compression process should be adopted. Traditional data compression (such as dictionary compression) is more time-consuming, so it is difficult to meet the requirements of real-time transmission.

For actual application, maintenance of real-time updating for CDS must cost little. Our solution is that when updating CDS, only changed portions of CDS are transmitted. One of said changed portions is information of added nodes. If there are i nodes added, then information with a length of i*p needs to be transmitted to each member node. The accumulated length of information of added nodes in the transmitting lifecycle is n*p. Quitting of nodes is processed as the same. So it can be wrought out that:

$$W_{CDS}=S/t \quad (2)$$

Equation (2) indicates that in the case that only entering and quitting are considered without packet head (such as UDP packet head) calculated, in the transmitting lifecycle, total information transmitted to each member for updating will not exceed S. It can be concluded that the average network bandwidth needed by each member to maintain CDS is $W_{CDS}$.

For example, when n=10000, p=200 bits (including node ID, ports, status as well as a little additional information, and generally, 200 bits are enough), q=20 bits (it is enough for quitting information of nodes to just identify node information), t=1 hour=3600 seconds (less than measured value of the existing P2P system), then $W_{CDS}$=611(bps). For 1M (bps) of content stream rate, maintenance cost is less than 0.1% of bandwidth that nodes use for content transmitting.

Better data compression process can be adopted for transmitting changed portions, which can make network bandwidth needed for maintaining CDS less than $W_{CDS}$. However, said data compression process must be applicable to real-time environments, and should be simple process and less time-consuming. Therefore, the specific technical processing steps provided by this invention to solve the technical problems are as follows:

1. The server extracts CDS needing maintenance at set time intervals or before transmitting the content packet;

2. Through comparing the whole set of the latest control data set of the group with the whole set of the previously existing control data set, especially of the latest CDS according to symbols, the server gets a change string, and the previous CDS for comparison can be empty;

3. A change set is got after transmutation and compression of the change string, and said change set carries SN marks of both the current CDS and the CDS for comparison;

4. The change set is transmitted to one or more nodes in the group so that the existing control data set can be updated to the latest one by the node.

The previous CDS for comparison in step 1 can be empty, and the change string can be the latest CDS.

The length of said symbol in step 2 is one or two bytes.

The main advantages brought by step 2 mentioned above are:

1) Comparison of the whole set replaces comparison according to records, which can easily improve efficiency, and can be simpler and more convenient, because when comparing according to records, items need to be compared one by one. For example, when the ith record changes, it is marked as [i+ the ith recorded content], and wherein i refers to the ith record, and then [i+ the ith recorded content] is transmitted to the client, which only updates the ith record according to the received content. Therefore, comparing according to records will be tedious and what's more inconvenient is that record classification of data sets is not known in many cases.

2) Comparison according to symbols replaces comparison according to records, which can transmit shorter data.

While updating and transmitting, generally changed portions will be transmuted to a change set to transmit for convenience.

Although network bandwidth needed by each member for CDS maintenance is narrow, (such as 1 k), if the server needs to transmit to each member, the bandwidth will be very huge (for example, 10M bandwidth is needed for the server with 10000 members). Therefore, when the amount of group members is larger than a preset value, P2P mode, especially G2G transmitting mode, should be adopted to transmit the change set. At this time, bandwidth needed by the server for updating CDS can be controlled to be the same with the bandwidth needed by single member. For example, the server with 10,000 members needs to keep 1 k (bps) bandwidth. For convenient implementation, bandwidth used by the server for updating CDS can be a little bit wider.

Another advantage of adopting G2G mode to transmit CDS updated portions in G2G mode is that the transmitting delay of the server caused by too many times of transmitting can be reduced. For example, a group with 10000 members, which originally needs to respectively transmit to 10,000 nodes, needs to transmit only once now.

One or more groups are used to manage nodes participating in a content delivery, and a plurality of basic group-to-group transmissions are used for large-scale content delivering tasks.

This invention is illustrated through a specific embodiment as follows.

When the content is transmitted by the transmitting group to the receiving group, it is necessary to distribute the content blocks, that is, to assign some or all members in the transmitting group to share respective content block transmission. While distributing, related information of members participating in transmitting needs to be known. The related information is provided by CDS of the transmitting group. For convenience, distribution is completed mainly by user management server, which can be full-time, or a certain node in charge of transmitting content for part-time.

Suppose that m members in the transmitting group own content C.

Generally speaking, the content needs to be divided when it is transmitted through many nodes of a certain unit to the receiver. For example, content C is divided into $C_1$ and $C_2$, and after transmitted, then make $f(C_1, C_2)=C$ f is recovering function, and there can be the same portions in $C_1$ and $C_2$ (what's more, redundancy is adopted for anti-mutation of network transmission). For simple implementation, disjoint division is adopted here, that is, $C_1 \cup C_2 = C$
$C_1 \cap C_2 = \Phi$ (empty set)

Actually, the content can be divided to many blocks. For example, $C = \{B_1, B_2, \ldots, B_m, \ldots\}$ It is more convenient to divide like this. For example, $C_1 = \{B_1, B_{1+m}, B_{1+2m}, \ldots\}$
$C2 = \{B2, B_{2+m}, B_{2+2m}, \ldots\}$ Therefore, in this embodiment, the process of the transmitting group transmitting the content to the receiving group is that according to information recorded on CDS of the transmitting group, the transmitting group divides content C to m portions, with content $C_k$ for node k. While transmitting, node k transmits $C_k$ to a plurality of nodes in the receiving group.

In the specific embodiment in schematic diagram of G2G content transmission in FIG. 4, 402, 404, 406 respectively represent three groups. There is only one node in the group represented by 402 which used as a transmitting group to divide content C into two portions $C_1$ and $C_2$, which are then respectively transmitted to the group represented by 404. The group represented by 404 can be a receiving group, and also be a transmitting after receiving content C to transmit content C to the receiving group represented by 406.

FIG. 4 shows that there can be one or more nodes in a transmitting group, and a plurality of nodes in the transmitting group can transmit one content together. For example, node 2 transmits $C_1$ portion, and node 3 transmits $C_2$ portion. When node 2 receives $C_1$ portion of the content and node 3 receives $C_2$ portion of the content and before exchanging, contents in node 2 and node 3 can be different, but G2G transmission still can be continued.

In the embodiment in FIG. 4, generally the nodes in the receiving group need to transmit again to other nodes in the group after receiving the content packet transmitted by the transmitting group. For example, after receiving $C_1$, node 4 needs to transmit it again to node 5 and node 6. When exchanging the content packet to other nodes in the group, nodes can transmit it to other nodes one by one, and when there are too many nodes in the group, exchange can be implemented according to the delivering tree of this content packet formed by CDS, that is, this content packet is transmitted to some of the nodes, and then transmitted again by these nodes to other nodes.

The further embodiment in FIG. 4 is a G2G delivering method of large-scale content comprising the following steps:

The content needing to be transmitted is divided into many portions;

Users receive data approximately in order, and users have certain content storage capacity to record the block number of the last received content block;

When users log in with the last received block number, it can be judged which the content part the block belongs to according to the block number, and then users that belong to the same portion of content are organized to be a session group;

The group that has received the contents part is in charge of transmitting the existing content to groups in need of such content. If no groups that have received the contents portion are found, then the server is in charge of content transmission. A method can be selected is: the group that has received the former n−1 content portions and is receiving the content from the nth portion is set to be $G_n$, and when $G_k$ (k<n) requests to transmit, searching the first appropriate group suits to in charge of transmission will start from $G_{k+1}$.

For the set group $G_n$, mentioned above, its number n changes dynamically. When $G_n$, completes receiving the nth portion of content and is ready to receive the n+1 th portion of content, $G_n$ changes to $G_{n+1}$.

During transmission, there is a process of group $G_k$ receiving content from group $G_{k+1}$ and exchanging it, and $G_k$ transmitting the content that already exists in $G_{k-1}$ to group $G_{k-1}$. The transmitting relationship among groups can be The server $=>G_n => G_{n-1} => \ldots => G_1$ This is an effective, high-capacity and high-performance method for G2G file downloading, which can support for achieving the VOD (Video-On-Demand) system. For example, supposing that there is a video content with 1 Mbps transmitting rate and a time of 100 minutes. The video content is divided into 100 receiving portions (each portion for each minute content), and then can be classified into 100 groups mostly. Groups that have already received the content are in charge of transmitting the content to groups that have not received it. Supposing that the largest number of users in the group is 10000, then a 1 Mbps data stream in the server can most support content transmission for 100 million users.

The key for implementing the method of large-scale content G2G delivering is "many-to-many" transmission. For example, when $G_{k+1}$ is transmitted to $G_k$, there may be a plurality of nodes in $G_{k+1}$. At this time, G2G transmission is represented like that content in a plurality of nodes in the transmitting group ($G_{k+1}$) is cooperatively transmitted to a plurality of nodes in the receiving group ($G_k$).

The method for large-scale content G2G delivering also shows the difference between the present invention and the prior art: compared with "one-to-many" transmission, this invention is multi-sources, that is, a plurality of nodes are in charge of content delivering; compared with "many-to-one" transmission, this invention is a cooperative transmission, that is, for the basic G2G transmission, there is a global transmission scheduling in this invention. Another difference is that besides re-transmission of content in nodes, there is re-transmission of content in groups, which is re-transmission with cooperation of a plurality of nodes.

Content can be audio/video data, data stream, computer files, UDP data packets on network, control data sets or change sets of control data sets. When being a transmitting content, a change set of CDS generally needs some special marks to be distinguished from regular content transmission. There is a current SN for the CDS as content and a SN used before changing is attached on transmitted content packet.

The flowchart of G2G/CDS processing is showed in FIG. 1, comprising the following steps:

In step 102, a new node is added into the specific transmitting group or receiving group. The receiving group can set the range of the number of nodes, and when beyond the range, nodes can be grouped to a plurality of groups.

In step 104, the user management server updates CDS of groups with changes, and modifies SN of CDS.

In step 106, when CDS change, perform step 110 of updating CDS of related nodes.

In step 108, content requested to be transmitted is divided into many portions. Rules for nodes in the transmitting group to take charge of transmitting content blocks is established, and content portions transmitted by nodes that in charge of the content transmission is set according to CDS of the transmitting group. For example, the content set that node j should transmits is set to be $C_k$, and then perform step 114.

In step 112, transmitted content firstly is implemented with read-in processing, in which each content portion is divided into some content blocks as processing units, so that documents and data stream can be processed together, and then perform step 114.

In step 114, nodes that in charge of transmitting, such as node k, judges whether the read-in content block belongs to $C_k$, and node k only transmits the content part it in charge of. If the read-in content belongs to $C_k$, then perform step 116, or else, no transmission is implemented.

In step 116, nodes that in charge of transmitting, such as node k, package the content blocks needing to be transmitted according to the structure of the content packet, and then perform step 118 of respectively transmitting the content packet to different nodes in the receiving group, and then perform step 120.

In step 120, when nodes in the receiving group receive the content packet, module 120 will implement corresponding process, including validity checking of the content packet, retransmitting of the content, supplementarily transmitting of the content and recovering of the content. Generally whether the content packet needs to be retransmitted is judged according to ET marks of the content packet.

An algorithm that node k in the transmitting group reads a content block and judges whether it should be transmitted by present node, and then transmit it is listed.

---
Algorithm 1,
---
```
while (send_content_true)
    for i=1 to n
        while (get_new_packet(read_packet) )
            if (read_packet ∈ C_k)
                send read_packet to node i;
                break;
            end if
        end for
```
---

For convenience, documents and data stream can be processed together by content read-in function. For example, continuous pluralities of content packets or packaged content packets can be got through function get_new_packet in algorithm 1. Read-in function shows that the content can be represented as the form of content stream, no matter it is real-time or existing.

If the node needs to supplement the data packet, a method can be pre-set so that nodes in the receiving group are classified into a number of support groups, and when nodes waiting for the content packet have not received it within the agreed receiving time, the request for supplementing packet is firstly sent to other nodes in the support groups to request the node to supplemenarily transmit the content packet it lacks.

There can be many ways to classify support groups, one of which is that supposed there are at most two members in a support group, two members with the adjacent number can be set to be a support group. There may be only one member in the last group. With only one member, the group can request other groups or the server to supplement data.

A strategy that nodes in the support group are made to receive the same content packet within a short period of time as possible when employing a normal transmission, can be adopted. Supposing that there are two nodes in a support group, then node i and node (i+1) are set to be the same support group. At this moment, the algorithm 1 can be amended to:

---
Algorithm 2:
---
```
while (send_content_true)
    for i=1 to n step 2
        while (get_new_packet(read_packet) )
            if (read_packet ∈ C_k)
                send read_packet to node i;
                send read_packet to node (i+1);
                break;
            end if
        end for
```
---

Since there are two nodes in the receiving group receiving the same content block simultaneously, so while exchanging, each node is in charge of exchange of content blocks of half nodes in the group.

An embodiment of CDS updating processing: at the server side, when the latest CDS (n) is compared with a previous CDS (k) (k can be equal to n−1, or be less than n−1) in the way of whole set comparison, comparing according to the symbols is employed. Classification of symbols is flexible and is not necessarily confined to one item. One symbol can be defined to be one or two bytes, while there are usually a few or ten more bytes in one item, so an item can be classified into many symbols. This kind of comparison reduces the contrastive units. For the method that only changed portions are transmitted, the smaller the contrastive units are, the less number of bytes of the change string got after comparison is. However, only change string is not enough for the client to update the control data set, still should tell the client the location of the change string. So in this embodiment, each change set comprises starting marks, new control data set marks, old control data set marks, at least one change string element and skewing value of the relative position of the change string element when it is empty. The change string element comprises a change string element head and a change string, and the change string element head comprises a mark of the change string head and a length of the change string. The method and effects of transmutation of the change set in this embodiment are as follows:

First of all, the comparison object is modified from comparison according to elements (records) to comparison according to "symbols". "Symbols" refers to bytes, half-words, words, double-words or other binary numbers that pre-selected to be improved. For easy understanding, data here are supposed to be formed by bytes, which can be one or two bytes.

w is supposed to be the arriving location corresponding to the beginning of the data set. Changed portions are extracted through comparison of the new data set with the old one in the order from the beginning to the end. The change set formed by the new control data set can be decomposed to:

< units of the change string 1 > < units of the change string 2>...< units of the change string i>...

<units of the change string i>can be represented as:
[the starting location of the change string i] [the length of the change string i][the change string i].

However, the starting location, which is usually represented by numbers with 4 bytes, needs to be improved. The starting location corresponding to the control data set head is modified to the starting location corresponding to the ending location of the previous change string. This relative location can be represented by the codes with variable length together with head marks represented by variable byte numbers (1-4 bytes) for the purpose of compression. The length of the string can also be represented by the codes with variable length together with head marks represented by variable byte numbers (1-4 bytes) for the purpose of further compression.

The improvement of <units of the change string i> is represented as [skewing i] [the head of the change string i] [the change string i].

Herein, [*] [*] means two small strings are connected to a big string, and also with:

Skewing: at least the skewing length of the variable length codes is included. 1-3 bites wide skewing head marks can also be set up in the skewing head to identify different strings or marks. When skewing head marks are adopted, the skewing length can be omitted.

The change string head: at least the change string length of the variable length codes is included. 1-3 bites wide change string head marks can also be set up in the starting location of the change string head to identify different strings or marks.

The simplified marking mentioned above is referred to as marking method according to relative location, which can achieve the following effects:

1, in many data sets that change dynamically, generally the changed amount during a certain period is a few. Especially when comparison according to shorter symbols is adopted, the transmission amount can be greatly reduced in the transmission that only changed portions are transmitted.

2, marking method according to relative location and codes with variable length can effectively reduce the additional information used for marking.

3, computation of comparison is very simple, which has nothing to do with the specific content and is just comparison according to symbols, which is applicable for real-time environments with the network changing dynamically.

A kind of change set with additional transmission information comprises:

[starting marks] [marks of the new control data set] [marks of the old control data set] [skewing 1] [change string head 1] [change string 1][skewing 2] [change string head 2] [change string 2] . . . [skewing i] [change string head i] [change string i] [checking sum] and [ending marks].

As indicated in FIG. 5, I is CDS(n−1) and II is CDS(n). IV is the composition of the change set in this embodiment. For example, two bytes in the ith item becomes "MN" from "CD", and the length of this item is 6 bytes. III is the composition of the change set in prior arts, and is got through comparing the latest data set Pn with its previous data set Pn−1 according to items. Four bytes are needed for location marking (that is, marking the ith item), two to four bytes for the change string length, and six bytes for the change string, so a total of twelve to fourteen bytes are needed. IV is the composition of the change set in this embodiment. After variable length codes compression, one to four bytes, usually one byte, are needed for skewing, one to four bytes, usually one byte, are needed for the change string length, and two bytes are needed for the change string, so a total of four to ten bytes are needed. It can be seen that in this embodiment with comparison according to symbols, the byte number of the change string is less, and change sets formed by compression is also less, so the transmission amount is reduced. Generally, an item can comprise tens of bytes, or even hundreds of bytes, but the changed bytes are usually several of them. In this case, the effect of this invention will be more remarkable.

After receiving a change set, the node searches out the existing control data set according to the SN of an existing control data set in the change set. The change set together with the existing CDS can be recovered to a new CDS.

It should be understood that different transformation of change sets based on the invention concepts in this invention should also be within the protection scope of this invention.

G2G/CDS communication protocol solves the problems of node management in the network communication and how to transmit content. However, G2G/CDS communication protocol lacks methods to guarantee QoS of communication, so the method of achieving transmission scheduling and congestion control based on the G2G/CDS communication protocol is provided in another embodiment of this invention to guarantee QoS of communications, which is referred to as the flow method, comprising the following steps:

In the process of content delivering, within the range of the bandwidth $W_j$ that can be used by the node j in the receiving group for content uploading, the system selects a reasonable uploading rate $U_j$, and Node j in the receiving group is made to participate in content uploading service at the uploading rate $U_j$ appointed by the system, wherein j=1, 2 . . . N, and N is the number of nodes in the receiving group, and said uploading rate coefficient $U_j$ satisfies the following relational expression:

$$(U_1 + \ldots + U_N) + L*D \geq f(N, D) \quad (3)$$

Wherein D is rate of content delivering, and f(N,D) is a function related to N*D, which is bandwidth needed by all nodes in the receiving group for content downloading. Supposing the bandwidth that can be used by the node j in the receiving group for content uploading is $W_j$, L*D is the sum of uploading rate provided by all nodes in the transmitting group.

The basic idea of the flow method is to make nodes participating in content delivering provide uploading content transmission at a rate appointed by the system.

The sum of uploading rate on each node in content delivering is equal to the sum of downloading rate on each node. There are source end and destination end when content is delivered, which are respectively represented and managed by the transmitting group and the receiving group. Nodes providing content uploading comprise both nodes in the transmitting group and the receiving group, while nodes providing content downloading can only be nodes in the receiving group. $D_R$ is set to be the sum of downloading rate on each node (in the receiving group), $U_S$ is set to be the sum of uploading rate on each node in the transmitting group (the source end) and $U_R$ is set to be the sum of uploading rate on each node in the receiving group (the destination end), that is, $$D_R = \Sigma_{Dj}, \ D_j \in \text{receiving group} \qquad (4)$$

$$U_S = \Sigma_{Ui}, \ U_i \in \text{transmitting group} \qquad (5)$$

$$U_R = \Sigma_{Uj}, \ U_j \in \text{receiving group} \qquad (6)$$

Then there is basic condition satisfying G2G transmission:

$$U_S + U_R \geq D_R \qquad (7)$$

Herein, the reason of replacing "=" with "≧" is that there may be packet loss during transmission.

Different from the meaning of the commonly used condition "the bandwidth of transmitting nodes≦the bandwidth of receiving nodes", condition (7) is to describe data stream relationship in communication rather than communication power relationship.

$U_S$ and $U_R$ are variable within a certain range, maximum of which are respectively set to be $U_{S\text{-}MAX}$ and $U_{R\text{-}MAX}$, and then $$U_{S\text{-}MAX} = \Sigma W_i, \ W_i \in \text{transmitting group} \qquad (8)$$

$$U_{R\text{-}MAX} = \Sigma W_j, \ W_j \in \text{receiving group} \qquad (9)$$

For content delivering, the content transmitting rate is represented by D, and Supposing that the number of members in the receiving group, then $D_R = N^*D$, or is represented by function $D_R = f(N,D)$ related to N and D, in which f(N,D) is downloading bandwidth needed by the receiving group for downloading content.

For the transmitting group, the best way to save bandwidth is to un-repeatedly send the content at rate D, but it is not enough in many cases, so in order to facilitate the implementation and highlight the content transmitting rate D, the transmitting group is set up to provide L*D uploading bandwidth (the content is sent for L times repeatedly). There is another expression:

$$U_S = L^*D \qquad (10)$$

When sending un-repeatedly, L=1.

From changes of condition (7), the basic condition satisfying G2G content delivering is that $$(U_1 + \ldots + U_N) + L^*D \geq f(N,D) \qquad (11)$$

$U_j \leq W_j$, $U_j \in$ receiving group, (j=1, 2, ... N)
$L^*D \leq U_{S\text{-}MAX}$
$D \leq D_{MAX}$ By modifying one or more parameters in condition (11), content delivering in various conditions can be achieved, and particularly adapt to network environments changing dynamically. This transmission method can also be described as:

G2G Flow Method:

Monitor the network transmission process or through QoS feedback to implement distributed transmission, by modifying one or more parameters in L, D, and each node Uj, and also a guaranteeing the basic conditions (11) to satisfy the G2G content delivering, so that the network transmission can be continued, and also can be controlled in expected ways.

Supposing that the average uploading rate provided by a node for content is $U_{avg}$, generally $U_{avg}$ approaches the content stream downloading rate D. When $W_j \leq U_{avg}$, the node j selects Uj=Wj; when $W_j > U_{avg}$, the $U_j$ selected should satisfy $U_j \geq U_{avg}$. When capabilities of some members are not enough, the nodes with affluent uploading bandwidth capabilities and the content source end undertake transmission together. An advantage of selections above is that users are self-undertake, and are with help of others (temporarily) when there are difficulties, which is called user self-undertake principle.

In principle, algorithm 1 also adapt to that nodes provide uploading content at a rate appointed by the system, because variable length can be adopted in new_packet in get_new_packet(new_packet, and the length is related to $U_j$. It can also be modified for more obvious express:

Algorithm 3, which is algorithm of the transmitting group end in which nodes provide uploading content transmission at a rate appointed by the system:

```
while (send_context_true)
    for i=1 to n {
        get_new_packet_by_length(Ck, new_packet, Ui);
        send new_packet to node i; }
```

The function get_new_packet_by_length($C_k$, new_packet, $U_i$) means extracting a data packet with a length proportionately related to $U_i$ from the content $C_k$ waiting to be transmitted in the node to new_packet. For example, m is set to be the number of nodes in the transmitting group, and $D_k$ is set to be the rate needed by node k in the transmitting group for read-in of the content stream needing to be transmitted, and then $D = D_1 + D_2 + \ldots + D_m$. $D_k$ is also the rate of node k uploading to the receiving group, and then the sum of length of content blocks transmitted by node k in the transmitting group to node j during a period of time t is set to be $U_j/U_R * D_k$ (bytes). Node j also transmits content with the same number of bytes to other nodes in the group.

Another embodiment of node j providing uploading content transmission at an appointed rate is: the length of a content block transmitted by the transmitting group to the receiving group is fixed, and it is in the way of delivering tree that nodes in the receiving group transmit the content block again to other nodes, and the number of nodes in next level that some one node j in the delivering tree transmit to is proportional to $U_j$.

The embodiment above shows that there can be different ways to make node j provide uploading content transmission at an appointed rate, and node j can be made to completes providing uploading content transmission at an appointed rate in different links of transmission process or by many links together.

Figure 6:
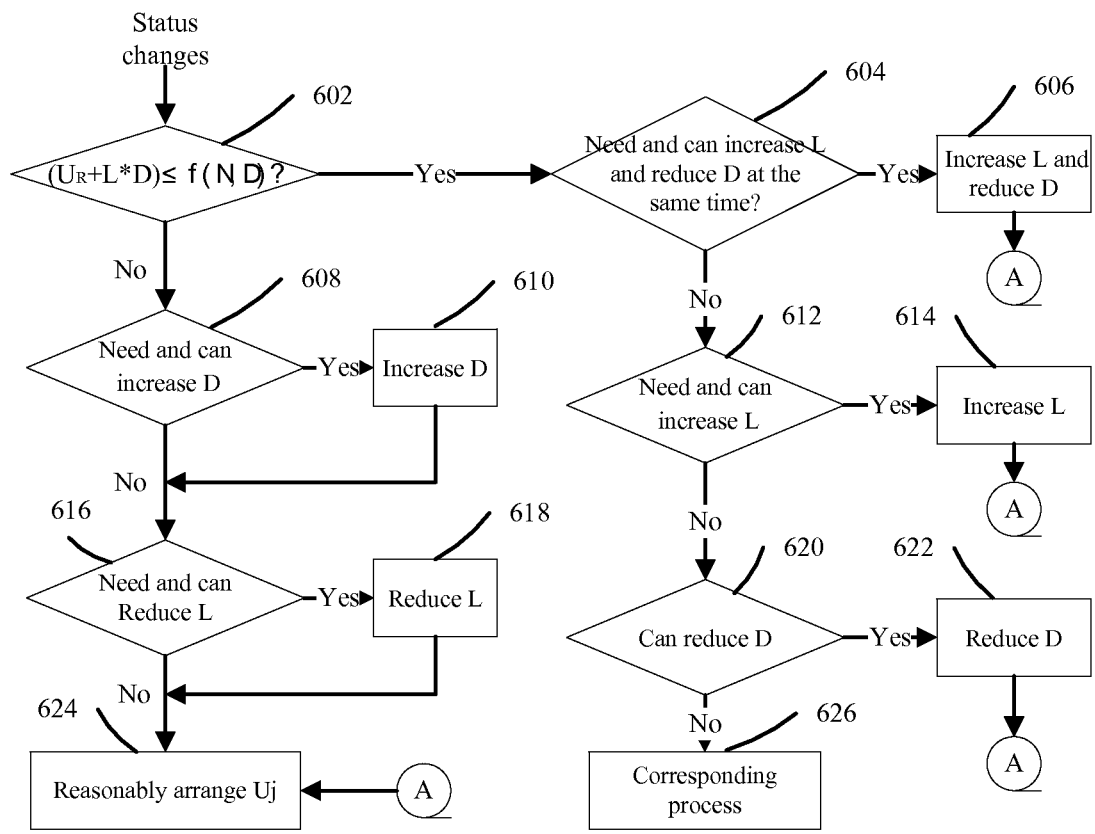
FIG. 6 is a flowchart of a G2G flow method according to present invention.

An embodiment of a flowchart of a G2G flow method as showed in FIG. 6 comprises the following steps:

In step 602, judge whether $(U_1 + \ldots + U_N) + L^*D \geq f(N,D)$ is satisfied, when parameters Wj, L and N change then the condition $(U_1 + \ldots + U_N) + L^*D \geq f(N,D)$ can not be satisfied, perform step 604, and when $U_1 + \ldots + U_N) + L^*D \geq f(N,D)$ is satisfied, perform step 608.

In step 604, judge whether need to and can increase L and reduce D at the same time is judged, and if yes, then perform step 606 of increasing L and reducing D, and if no, then perform step 612 of judging whether need to and can increase L, if yes, then perform step 614 of increasing L, and if no, then perform step 620 of judging whether D can be reduced, if yes, then perform step 622 of reducing D, and if no, then perform step 626 of implementing corresponding processing.

In step 608, judge whether D need and can be increased. If yes, then perform step 610 of increasing D, and if no, then perform step 616 of judging whether L need and can be reduced. If yes, then perform step 618 of reducing L, and if no, then perform step 624 of reasonably arranging uploading rate $U_j$, such as properly modifying parameters $U_j$, L and D.

When parameters $W_j$, L and N change, and parameters L or D (module 602, 608 and 616) need and can be modified, parameters $U_j$, L and N (module 624, 610 and 618) can be properly modified.

When the flow method is implemented, generally L and D should be fixed firstly, and then $U_j$ is arranged reasonably (step 624). There are two preferred calculating methods of $U_j$.

Method 1:

1, calculate an appropriate DR, and $U_R \geq f(N,D) - L*D$ is satisfied. Then calculate $U_{avg} = U_R/N$.

2, firstly, according to the principle of user self-undertake, When $W_j \leq U_{avg}$, the node j selects $U_{j,0} = W_j$; when $W_j > U_{avg}$, the node j selects $U_{j,0} = U_{avg}$. Remaining uploading bandwidth of the node $W_{j,1} = W_j - U_{j,0}$.

Then, uploading rate is further distributed for nodes with remaining uploading capacity:

$$U_{j,1} = \left(U_R - \sum_{i=1,\ldots,N} U_{i,0}\right) \frac{W_{j,1}}{\sum_{i=1,\ldots,N} W_{i,1}}$$

3, $U_j = U_{j,0} + U_{j,1}$.

Method 2:

For calculation convenience, some simplification is made that transmitted standard content block is used as unit of rate. Supposing that there are N members in the group, and then during a period of time t, N members totally need to upload M content blocks. The same, uploading bandwidth of nodes is represented as times of basic rate $D_o$, and members with uploading rate $D_o$ upload one content block during time t.

Make statistics of the number of members M1 with uploading rate $1D_o$, and the number M2 of members with uploading rate $2D_o \ldots$, when distributing, each member with uploading capacity ($W_j \geq 1 D_0$) is firstly assigned with one content block, and when it is not enough, one content block is additionally assigned to members with remaining uploading capacity ($W_j \geq 2 D_0$), and when it is enough not again, one more content block is additionally assigned to members with remaining uploading capacity ($W_j \geq 3 D_0$), . . . .

From needed M1, M2, . . . , $M_k$ can be calculated, that is the minimum k can be found to satisfy $$(M_1 + M_2 + \ldots + M_k) \geq M$$

After k is calculated, $U_j = \min(W_j \% D_0, k) * D_0$.

Corresponding processing in step 626 mentioned above comprises one or more of the following steps:

A, when data is allowed to be dropped, drop the content that not transmitted in time;

B, when multi-bit encoding content is transmitted, entering, if contents with a lower rate access.

C, deal with it as a transmission failure.

The system to implement methods above comprises that a grouping device, which is used to classify nodes participating in content transmission into a transmitting group in charge of transmitting content and a receiving group in charge of receiving content, and to classify nodes that have existed or will participate and in charge of content transmission into the transmitting group management, and to classify nodes that have existed or will participate and need to receive content under the receiving group management; a control data set generation device, which is used to establish a control data set reflecting information of the group it belongs to for each transmitting group or receiving group, also to set a serial number for each control data set, and to update the serial number after the change of the control data set in every time or during a period of time, so as to make one-to-one correspondence between the control data set and the serial number, said control data set at least comprises basic information of each node in the group, which at least comprises communication address of this node; a transmitting device, which is used to deliver the control data set to each node of the group, and make each node keep the latest control data set of the group; a first processing device, which is used to divide content that needs to be transmitted into a plurality of portions, and assign the content portions need to be transmitted to nodes in the transmitting group; a second processing device, which is used to control nodes in the transmitting group to divide the content that needs to be transmitted into a plurality of content blocks, and assemble the content blocks to a content packet, which comprises serial number marks of the control data set, and said transmitting device is also used to deliver the control data set of the receiving group that receiving this content packet to nodes in the transmitting group; a third processing device, which is used to control nodes in the transmitting group to set the serial number marks of the control data set to be the current serial numbers of the control data set of the receiving group that receiving this content packet before transmitting; a fourth processing device, which is used to control nodes in the transmitting group respectively transmit the data packet to at least one node of the receiving group, according to the control data set of the receiving group; a fifth processing device, which is used to control the node in the receiving group to transmit said content blocks again to other nodes in need of the content blocks in the group after receiving the content packet transmitted from the transmitting group according to the control data set indicated by the serial number marks of the content packet; a content recovering device, which is used to control nodes in the receiving group to recover the content blocks transmitted by each node to the transmitted content.

Wherein, said control data set generation device comprises a control data set extraction unit, which is used to make the server extract the control data set of the group needing maintenance at the set time intervals or before transmitting the content packet, a comparison unit, which is used to get a change string through comparing the whole set of the latest control data set of the group with the whole set of the previously existing control data set according to symbols, a transmutation unit, which is used to get a change unit of a change set through transmuting and compressing the change string, wherein said change set carries serial number marks of both the latest control data set and the existing control data set as a comparing base, a transmission unit, which is used to transmit the change set to at least one of the nodes in the group so that the existing control data set can be updated to the latest one by the node.

A sixth processing unit is also included, which is used to make each node in the group process the content according to the control data set of the group, including validity checking of the received content packet, content retransmitting and content supplementarily transmitting.

A congestion control device can also be further included, which comprising a rate selection unit, which is used to select a reasonable uploading rate $U_j$ according to the bandwidth $W_j$ that can be used by the node j in the receiving group for content uploading, a seventh processing unit, which is used to control node j in the receiving group to participate in content uploading service at the uploading rate $U_j$ appointed by the system, wherein j=1, 2 . . . N, and N is the number of nodes in the receiving group, and said uploading rate coefficient $U_j$ satisfies the following relational expression.

$$(U_1+\ldots+U_N)+L*D \geqq f(N,D)$$

Wherein D is rate of content delivering, and f(N,D) is a function related to N*D, which is the bandwidth needed by all nodes in the receiving group for content downloading. L*D is the sum of uploading rate provided by all nodes in the transmitting group.

Figure 7:
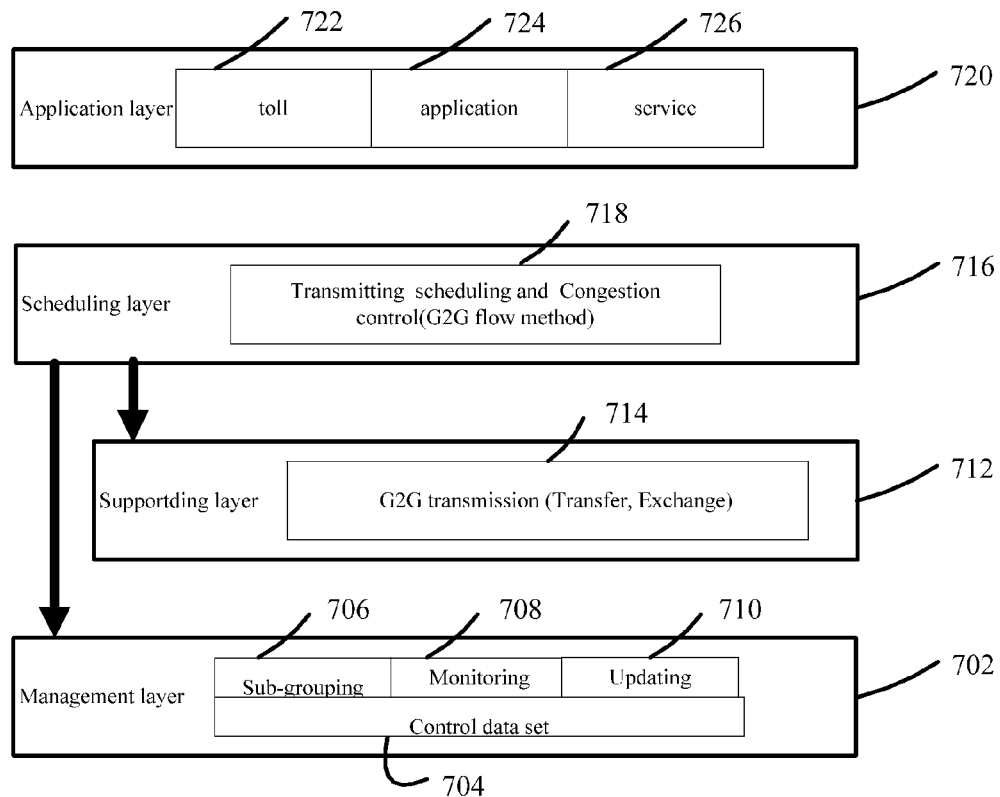
FIG. 7 is a system structure diagram applied by a G2G/CDS flow method according to present invention.

FIG. 7 is a system structure diagram of how to use G2G/CDS and common methods of G2G flow method, in which the system is divided into management layer 702, support layer 712, scheduling layer 716 and application layer 720.

There is a grouping module 706 in charge of group management of users. Specifically, when logging in, a user enters a specific group through grouping, such as a transmitting group or a receiving group. Said status change is recognized through a monitoring module 708. Monitoring can be a periodicity query, and also a single event query, as well as all kinds of feedback information such as QOS.

Information formed in grouping and monitoring is recorded in group information—CDS 704, which provides direct support for support layer and scheduling layer. An Updating module 710 is in charge of updating of the control data set of the related groups and specific members.

Support layer provides communication basis, that is, G2G transmission module 714, including Transfer transmission and Exchange transmission.

Scheduling layer mainly consists of module 718 formed by G2G flow method.

Application layer consists of many kinds of tools 722, such as establishing and monitoring content distribution; many specific applications 724, such as distributed computing (applied in science research, finance and so on), streaming media, content and file sharing, as well as communication and cooperation systems; and many kinds of services 726 etc.

This invention can also be implemented in distributed computer environments, in which a task is executed by the nodes linked through wired or wireless network. These nodes, such as remote processing equipments or facilities, can be those built for the special purpose, or all kinds of general machines running with computer programs developed according to the theory presented in the present invention. In distributed network environments, programs can be kept locally or in remote storage devices.

This invention can also be presented as computer readable codes in computer readable medium, which will be thought to include any mechanism of storing and sending information in computer readable way. For instance, the computer readable medium includes read-only memory (ROM), random access memory (RAM), magnetic disk storage medium, optical storage medium, flash storage device, transmission signals of electrical, optical, acoustic or other forms (such as carrier wave, infrared signal, digital signal, etc.)

This invention has been introduced for purpose of description and demonstration, which does not mean that it is exhaustive or limited to what has been demonstrated. To avoid that one or more invention will be difficult to understand, the description may omit some information already known by one skilled in the related art. For one skilled in the related art, many modification and changes will be obvious. For example, these steps can be performed in different orders, or some of them can be added, deleted and modified. All of these changes are regarded as a part of this presented invention.

What is claimed is:

1. A content delivering method for computer network, comprising a basic group-to-group transmission, and said group is a collection of nodes with the same attributes and said basic group-to-group transmission comprising the following steps:

A1, classifying nodes participating in content transmission into transmitting groups in charge of transmitting content and receiving groups in charge of receiving content, and classifying nodes that have participated in or will participate in and in charge of content transmission into a transmitting group management, and classifying nodes that have participated in or will participate in and need to receive content into a receiving group management;

B1, establishing a control data set reflecting information of the group it belongs to for each transmitting group or receiving group, and setting each control data set with a serial number which is updated after change of the control data set in every time or during a period of time, so as to establish one-to-one correspondence between the control data set and the serial number, said each control data set at least comprises basic information of each node in the group, which at least comprises the communication address of said each node;

C1, delivering each control data set to each node of said each transmitting group or receiving group, and keeping the latest control data set of said each transmitting group or receiving group for each node;

D1, dividing content that needs to be transmitted into a plurality of portions, and assigning the portions need to be transmitted to nodes in the transmitting group which taking charge;

E1, dividing portions need to be transmitted into a plurality of content blocks, then assembling the plurality of content blocks to be a content packet by the Nodes in the transmitting group, wherein, the content packet comprises serial number of the each control data set;

F1, delivering the each control data set of the receiving group that receiving this content packet to nodes of the transmitting group, and before the content packet transmission, the serial number marks of the control data set is set to be current serial numbers of the control data set of the receiving group that receiving this content packet;

G1, transmitting the content packet to at least one node of the receiving group by nodes in the transmitting group respectively according to the control data set of the receiving group;

H1, transmitting the content packet again to other nodes in need of the content packets within the group according to the control data set indicated by the serial number marks of the content packet by the at least one node of the receiving group;

I1, recovering the transferring the content packet to the content-that needs to be transmitted by each node to the transmitted content by nodes in the receiving group;

wherein, said changes of the control data set in step B1 include the entering, quitting of the nodes, the changes of the task and the change of the node status, and said node preserves many control data sets with different serial numbers;

the way of making each node keep the latest control data set of the group in said step B1 comprises the following steps:

B11, The server extracts the control data set of the group which needs maintenance at the set time intervals or before transmitting the content packet;

B12, Through comparing the whole set of the latest control data set of the group with the whole set of the previously existing control data set according to symbols thereof, the server gets a change string;

B13, A change set is got after transmutation and compression of the change string, and said change set carries serial number marks of both the latest control data set and the existing control data set as a comparison base;

B14, The change set is transmitted to at least one of the nodes in the group so that the existing control data set can be updated to the latest one by the node;

the length of said symbol in step B12 is one or two bytes;

wherein, a change set got after transmutation and compression of the change string in said step B13 comprises [starting marks][serial number of the new control data set][serial number of the old control data set][skewing 1][change string head 1][change string 1][skewing 2][change string head 2][change string 2]... [skewing i][change string head i][change string i][checking sum] and [ending marks], wherein the skewing at least comprises skewing length of the variable length codes, and the change string head at least comprises change string length of the variable length codes, and the change string is the changed portions of the new control data set compared with the old control data set, and i is the number of the change string in the change set, and is an integral number greater than or equal to zero.

2. The content delivering method for computer network according to claim 1, wherein, after receiving some or all content, said receiving group becomes a new transmitting group, which continues transmitting the received content to another receiving group.

3. The content delivering method for computer network according to claim 1, wherein, the attributes of said node can be selected from contents, tasks, network rate, location, distance, delay, node identification, stability, on-line time, packet loss rate, location of starting to receive contents, and any attributes related to tasks, behaviors, individual difference, and identification.

4. The content delivering method for computer network according to claim 1, wherein, one or more groups are used to manage nodes participating in a content delivery, and a plurality of basic group-to-group transmissions are used for large-scale content delivering tasks.

5. The content delivering method for computer network according to claim 1, wherein, each node in the receiving and transmitting groups processes the content according to the control data set of the group, including validity checking of the received content packet, content retransmitting and content supplementarily transmitting.

6. The content delivering method for computer network according to claim 1, wherein, Said content can be audio / video data, data stream, computer files, UDP data packets on network, control data sets or change sets of control data sets.

7. The content delivering method for computer network according to claim 1, wherein, nodes in the receiving group are classified into many supporting groups in a preset way, and when nodes in one supporting group have not received the content packet during the agreed receiving time period, the nodes will send a supplementing packet request to other nodes in the supporting group to request content packet.

8. The content delivering method for computer network according to claim 1, wherein, in the process of content delivering, following steps are also comprised:

A2, Based on the bandwidth $W_j$ that can be used by the node j in the receiving group for content uploading, the system selects a reasonable uploading rate $U_j$;

B2, Node j in the receiving group is controlled to participate in content uploading service at the uploading rate $U_j$ appointed by the system, wherein j=1, 2... N, and N is the number of nodes in the receiving group, and said uploading rate coefficient $U_j$ satisfies the following relational expression:

$$(U_1+\ldots+U_N)+L*D \geqq f(N,D)$$

Wherein, D is rate of content delivering, and f(N,D) is a function related to N*D, which is the bandwidth needed by all nodes in the receiving group for content downloading; L*D is the sum of uploading rate provided by all nodes in the transmitting group.

9. The content delivering method for computer network according to claim 8, wherein, in said step A2, the system can select a reasonable uploading rate $U_j$ by the following steps:

When bandwidth $W_j$ that can be used by the node j for content uploading is narrower than or equal to average uploading rate $U_{avg}$ provided by the node for content, then select Uj=Wj;

When bandwidth $W_j$ that can be used by the node j for content uploading is wider than average uploading rate $U_{avg}$ provided by the node for content, then $U_j$ selected should satisfy $U_j \geqq U_{avg}$.

10. The content delivering method for computer network according to claim 9, wherein, when parameters Wj, L and N change, then the condition $(U_1+\ldots+U_N)+L*D>f(N,D)$ can not be satisfied, parameters $W_j$, L and D can be modified appropriately, or when parameters $W_j$, L and N change and parameter L or B needs to be and also can be changed, parameters $W_j$, L and D can be modified appropriately.

* * * * *